US012739391B2

(12) United States Patent
Jung et al.

(10) Patent No.: US 12,739,391 B2
(45) Date of Patent: Sep. 15, 2026

(54) REFERENCE PICTURE RESAMPLING (RPR) BASED SUPER-RESOLUTION WITH WAVELET DECOMPOSITION

(71) Applicant: GUANGDONG OPPO MOBILE TELECOMMUNICATIONS CORP., LTD., Dongguan (CN)

(72) Inventors: Cheolkon Jung, Dongguan (CN); Hui Lan, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 19/175,130

(22) Filed: Apr. 10, 2025

(65) Prior Publication Data

US 2025/0240429 A1 Jul. 24, 2025

Related U.S. Application Data

(63) Continuation of application No. PCT/CN2022/125209, filed on Oct. 13, 2022.

(51) Int. Cl.
*H04N 19/132* (2014.01)
*G06T 3/4046* (2024.01)
(Continued)

(52) U.S. Cl.
CPC ......... *H04N 19/132* (2014.11); *G06T 3/4046* (2013.01); *G06T 3/4053* (2013.01); (Continued)

(58) Field of Classification Search
None
See application file for complete search history.

(56) References Cited

U.S. PATENT DOCUMENTS 11,115,651 B2 * 9/2021 Marpe .................. H04N 19/102
11,991,362 B2 * 5/2024 Jang ..................... H04N 19/117
(Continued)

FOREIGN PATENT DOCUMENTS

WO 2021262053 A 12/2021
WO 2022191064 A 9/2022

OTHER PUBLICATIONS

International Search Report and Written Opinion of the International Searching Authority regarding International Patent Application No. PCT/CN2022/125209, dated Jun. 1, 2023.

(Continued)

*Primary Examiner* — Talha M Nawaz
(74) *Attorney, Agent, or Firm* — Sheppard, Mullin, Richter & Hampton LLP

(57) ABSTRACT

A method for video processing includes receiving an input image via an initial feature extraction portion, where the initial feature portion includes a result of RPR up-sampling, a low resolution (LR) reconstructed frame, and an LR predicted frame; processing the input image by a first convolution layer; and processing the input image by a multi-level semantic information mapping portion to generate a combined image, where the multi-level semantic information mapping portion includes one or more residual spatial and channel attention blocks (RSCBs). Each of the RSCBs includes two or more residual spatial blocks (RSBs) and a channel attention (CA) block. Each of the RSBs includes a spatial attention (SA) block.

19 Claims, 15 Drawing Sheets

400A

400B

(51) Int. Cl.

| | |
|---|---|
| ***G06T 3/4053*** | (2024.01) |
| ***H04N 19/172*** | (2014.01) |
| ***H04N 19/176*** | (2014.01) |
| ***H04N 19/33*** | (2014.01) |

(52) U.S. Cl.

CPC ......... *H04N 19/172* (2014.11); *H04N 19/176* (2014.11); *H04N 19/33* (2014.11)

(56) References Cited

U.S. PATENT DOCUMENTS

| | | | | |
|---|---|---|---|---|
| 2019/0289323 | A1* | 9/2019 | Wiegand .............. | H04N 19/593 |
| 2022/0148131 | A1 | 5/2022 | Wang et al. | |
| 2022/0321919 | A1 | 10/2022 | Deshpande | |
| 2023/0370610 | A1* | 11/2023 | Park ..................... | H04N 19/157 |
| 2024/0080470 | A1* | 3/2024 | Li ........................ | H04N 19/142 |
| 2024/0267517 | A1* | 8/2024 | Jang ..................... | H04N 19/117 |

OTHER PUBLICATIONS

Chen et al., “An Overview of Coding Tools in AV1: the First Video Codec from the Alliance for OpenMedia”, SIP (2020), vol. 9, e6, revised Dec. 19, 2019.

Lin et al., “CNN-based Super Resolution for Video Coding Using Decoded Information”, 2021 International Conference on Visual Communications and Image Processing (VCIP), 2021.

Li et al., “Convolutional Neural Network-Based Block Up-Sampling for Intra Frame Coding”, IEEE Transactions on Circuits and Systems for Video Technology, vol. 28, No. 9, Sep. 2018.

He et al., “Deep Residual Learning for Image Recognition”, Dec. 10, 2015.

Bross et al., “Versatile Video Coding (Draft 7)”, Joint Video Experts Team (JVET) of ITU-T SG 16 WP 3 and ISO/IEC JTC 1/SC 29/WG 11, JVET-P2001-vE, Oct. 1-11, 2019.

Urban et al., “Multi-thread VTM decoder: information update”, Joint Video Experts Team (JVET) of ITU-T SG 16 WP 3 and ISO/IEC JTC 1/SC 29, JVET-V0088-v3, Apr. 20-28, 2021.

Liu et al., “JVET common test conditions and evaluation procedures for neural network-based video coding technology”, Joint Video Experts Team (JVET) of ITU-T SG 16 WP 3 and ISO/IEC JTC 1/SC 29, JVET-W2016-v1, Jul. 7-16, 2021.

Hu et al., “Squeeze-and-Excitation Networks”, May 16, 2019.

Andrei et al., “Supervegan: Super Resolution Video Enhancement GAN for Perceptually Improving Low Bitrate Streams”, IEEE Access, received May 7, 2021, accepted Jun. 1, 2021, date of publication Jun. 18, 2021, date of current version Jul. 1, 2021.

Lan et al., “RPR Based Super-Resolution for Video Compression with Wavelet Decomposition”, Media Lab, School of Electronic Engineering, Xidian University, Dec. 26, 2024.

* cited by examiner (Ground Truth)

$Pre_{LR}/Rec_{LR}$ $RPR_{\_\{output\}}$

Proposed

REFERENCE PICTURE RESAMPLING (RPR) BASED SUPER-RESOLUTION WITH WAVELET DECOMPOSITION

CROSS-REFERENCE TO RELATED APPLICATIONS

This application is a Continuation Application of International Application No. PCT/CN2022/125209 filed Oct. 13, 2022, which is incorporated herein by reference in its entirety.

TECHNICAL FIELD

This present disclosure relates to image processing. For example, the present disclosure includes video compression schemes that can improve video reconstruction performance and efficiency. More specifically, the present disclosure is directed to systems and methods for providing a convolutional neural network filter used for an up-sampling process, with a wavelet decomposing process involved.

BACKGROUND

Video coding of high-definition videos has been the focus in the past decade. Although the coding technology has improved, it remains challenging to transmit high-definition videos with limited bandwidth. Video with higher resolution and frame rates can bring better visual experience, but it also significantly increases the amount of video data, which brings great challenges to transmission and storage.

Approaches coping with this problem include resampling-based video coding, in which (i) an original video is first "down-sampled" before encoding to form an encoded video in the encoder side (the encoder includes a decoder to generate bitstream), (ii) the encoded video is transmitted to the decoder side as bitstream and then the bitstream is decoded in decoder to form a decoded video (the decoder is the same as the decoder included in the encoder); and (iii) then the decoded video is "up-sampled" to the same resolution as the original video. For example, Versatile Video Coding (VVC) supports a resampling-based coding scheme (reference picture resampling, RPR), that a temporal prediction between different resolutions is enabled. However, traditional RPR upsampling used a simple interpolation method, which cannot reconstruct clear and accurate edge information, especially for videos with complex characteristics. Therefore, it is advantageous to have an improved system and method to address the foregoing needs.

SUMMARY

One aspect the present disclosure is that it provides a CNN filter that uses LR reconstructed frame (Rec), LR prediction frame (Pre), and RPR up-sampled frames as an input for the RPR-based SR network. By this arrangement, the CNN filter not only learns mapping relationships between LR and HR frames, but also effectively removes blocking artifacts in reconstructed frames. In some embodiments, a spatial attention (SA) process and a channel attention (CA) process can be combined to enable the network to pay more attention to specific region and edge information. In some embodiments, residual blocks (RBs) and dense connections can be used to prevent information loss. Further, RPR up-sampled frames can be added to the output of our network so as to accelerate the learning speed of the network and prevent visual gradient features from disappearing.

Another aspect of the present disclosure is that it provides an efficient coding strategy based on resampling. The present system and methods can effectively reduce transmission bandwidth so as to avoid or mitigate degradation of video quality.

In some embodiments, the present method can be implemented by a tangible, non-transitory, computer-readable medium having processor instructions stored thereon that, when executed by one or more processors, cause the one or more processors to perform one or more aspects/features of the method described herein. In other embodiments, the present method can be implemented by a system comprising a computer processor and a non-transitory computer-readable storage medium storing instructions that when executed by the computer processor cause the computer processor to perform one or more actions of the method described herein.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

DETAILED DESCRIPTION

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

Figure 1:
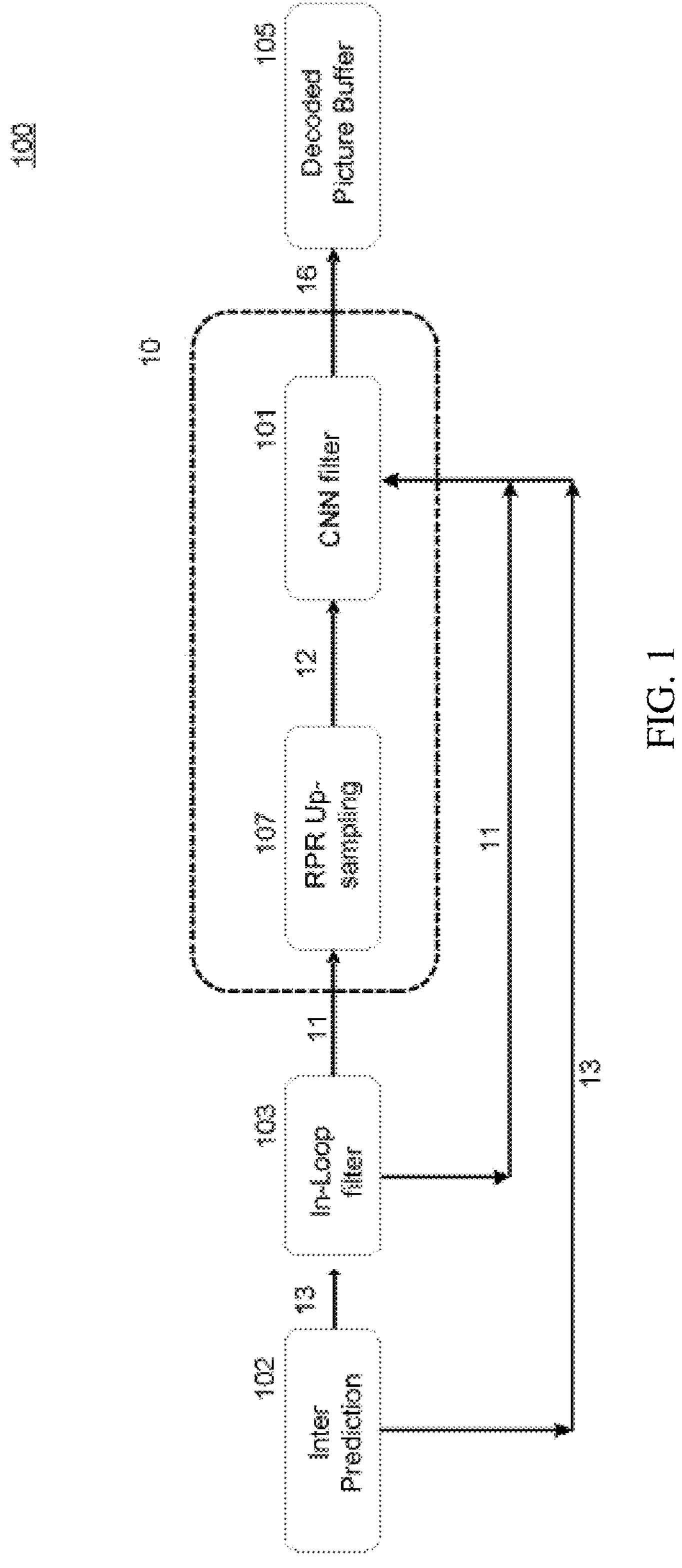
FIG. 1 is a schematic diagram illustrating an up-sampling process in resampling-based video coding in accordance with one or more implementations of the present disclosure.

FIG. 1 is a schematic diagram illustrating an up-sampling process in a resampling-based video coding framework 100 in accordance with one or more implementations of the present disclosure. To implement an RPR functionality in resampling-based video coding, a current frame for encoding is first down-sampled to reduce bitstream transmission and then is restored at the decoding end. The current frame is to be up-sampled to its original resolution in an up-sampling process 10. The up-sampling process 10 can include an RPR up-sampling process 107 as well as a CNN filter 101 with a wavelet decomposing process involved.

As shown in FIG. 1, images can be sent for the up-sampling process 10 from an in-loop filter 103. In some implementations, the in-loop filter 103 can be applied in encoding and decoding loops, after an inverse quantization process and before storing processed images in a decoded picture buffer 105. In the up-sampling process 10, the RPR up-sampling module 107 receives images 11 from the in-loop filter 103, and then generates up-sampled frames 12 and transmits the same to the CNN filter 101. The in-loop filter 103 also sends reconstructed frames ($Rec_{LR}$) 11 to the CNN filter 101. The CNN filter 101 then processes the up-sampled frames 12 and the reconstructed frames 11 and sends processed images 16 to the decoded picture buffer 105 for further processes (e.g., to generate decoded video sequences). As also shown in FIG. 1, predicted frames ($Pre_{LR}$) 13 can be sent to the in-loop filter 103 and the CNN filter 101 from an inter-prediction module 102. By the foregoing arrangement, the predicted frames 13 and the reconstructed frames 11 are both used as input for the CNN filter 101.

The proposed resampling-based video coding framework 100 significantly improves the efficiency of video compression, at least because it can recover high-quality video frames more effectively. The proposed resampling-based video coding framework 100 also includes an RPR-based SR process for video compression with wavelet decomposition. More particularly, LR reconstruction frames, LR prediction frames, and the result of RPR up-sampling are used as input of the proposed framework/network 100. Accordingly, mapping relationships between LR and HR frames can be learned. Further, the characteristics of blocking artifacts and the details of initial up-sampling frames can also be obtained.

In some embodiments, for feature extraction, the proposed network 100 uses spatial attention (SA) and channel attention (CA) mechanisms so as to enable the network 100 to pay more attention to specific regions/edges of interests (e.g., high frequency features). In some embodiments, for information transmission, the network 100 combines residual connections (see FIG. 3A) and dense connections (see FIG. 3B) to (1) improve a convergence speed of the network 100, (2) prevent gradient features from disappearing, and (3) reuse of different receptive fields so as to prevent or at least mitigate information loss. Embodiments of the up-sampling process 10 are discussed in detail with reference to FIG. 2.

Figure 2:
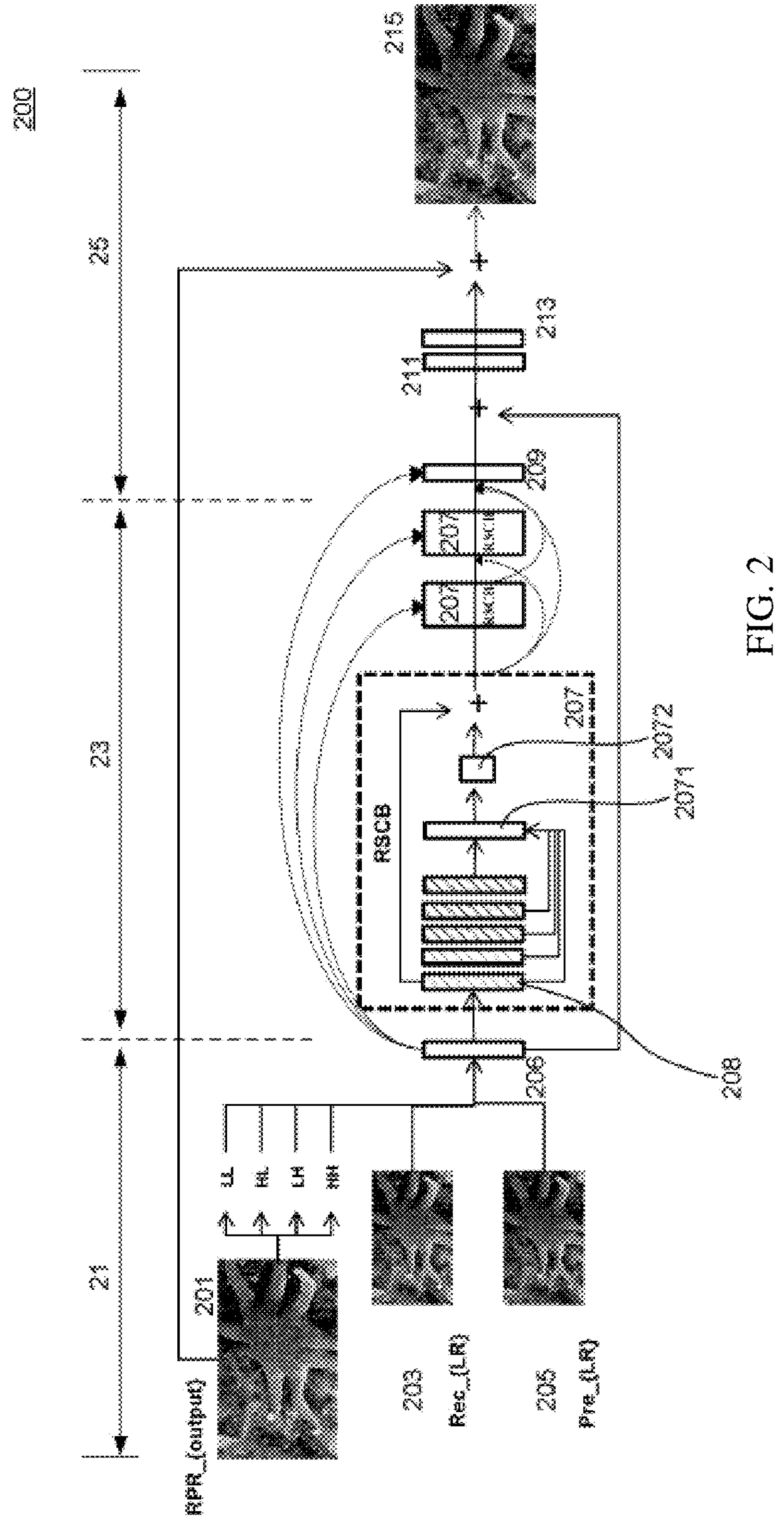
FIG. 2 is a schematic diagram illustrating an RPR-based super-resolution (SR) network or framework in accordance with one or more implementations of the present disclosure.

FIG. 2 is a schematic diagram a schematic diagram illustrating an RPR-based super-resolution (SR) network/framework 200 in accordance with one or more implementations of the present disclosure. The RPR-based SR network 200 includes three portions, an initial feature extraction portion 21, a multi-level semantic information mapping portion 23, and a reconstruction portion 25.

As shown in FIG. 2, the initial feature extraction portion 21 includes a convolutional layer 201. The convolutional layer 201 is configured to integrate and extract preliminary features of three inputs, a result of RPR up-sampling 201 ("$RPR_{output}$"), LR reconstructed frames ("$Rec_{LR}$") 203, and LR predicted frames ("$Pre_{LR}$") 205.

The size of $RPR_{output}$ 201 can be different from the sizes of the other inputs 203, 205. In some embodiments, the size of $RPR_{output}$ 201 can be twice of the sizes of the inputs 203, 205. To enable these three inputs 201, 203, 205 to be concatenated, a discrete wavelet transform (DWT) process is performed for $RPR_{output}$ 201 such that $RPR_{output}$ 201 can be transformed into frequency domains.

More particularly, for example, $RPR_{output}$ 201 can be decomposed into four wavelet sub-bands or frequency components: a low frequency feature (LL) sub-band, a vertical feature (HL) sub-band, a horizontal feature (LH) sub-band, and a diagonal feature (HH) sub-band. The dimensions of the four frequency components (LL, HL, LH, and HH) obtained after the DWT transformation are the same as those of $Pre_{LR}$ 205 and $Rec_{LR}$ 203. The four frequency components can then be concatenated with $Pre_{LR}$ 205 and $Rec_{LR}$ 203 as inputs to the SR network 200. Advantages of the DWT process include that: (1) the DWT process converts $RPR_{output}$ 201 into four frequency components which have the same size as $Pre_{LR}$ 205 and $Rec_{LR}$ 203; (2) the DWT process does not lose any information; (3) the DWT process reduces the size of the input video frame (e.g., $RPR_{output}$ 201) and therefore reduces the network complexity.

After the foregoing feature extraction process, the initial feature extraction portion 21 gets initial features $f_i$. In some embodiments, the kernel size of the convolutional layer 206 can be "3×3."

The multi-level semantic information mapping portion 23 includes one or more residual spatial and channel attention blocks (RSCBs) 207 (three are shown in FIG. 2 as an example). Each RSCB 207 can have five residual spatial block (RSB) 208. Details of the RSB 208 are discussed in FIG. 3.

Figure 3A:
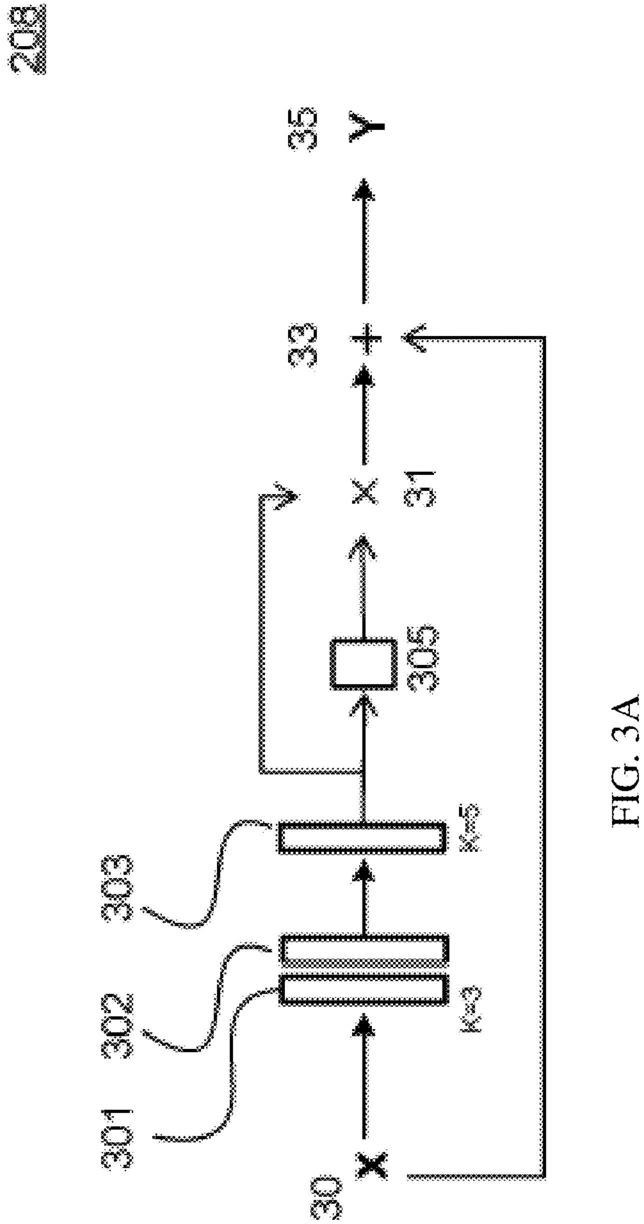
FIG. 3A is a schematic diagram illustrating a residual spatial and channel attention block (RSCB) in accordance with one or more implementations of the present disclosure.

Referring to FIG. 3A, the RSB 208 includes a front convolutional layer 301 (with kernel size "3×3"), a rectified linear unit (ReLU) layer 302, a rear convolutional layer 303 (with kernel size "5×5"), and a spatial attention (SA) block 305. The RSB 208 includes a "local skip" connection, which adding an input (X) 30 of the RSB 208 with residual information calculated at a multiplication module 31 at an adder 33. The adder 33 then send the added result as an output (Y) 35 of the RSB 208.

Referring back to FIG. 2, the multi-level semantic information mapping portion 23 combines different receptive files features by concatenating the outputs of the five RSBs 208 and uses a "1×1" convolutional layer 2071 to reduce the channel numbers. A channel attention (CA) block/module 2072 is then utilized to obtain the weight of channel. The multi-level semantic information mapping portion 23 effectively combines spatial and channel attention mechanisms (e.g., the SA block 305 in FIG. 3 and the CA module 2072 in FIG. 2), and therefore the proposed network 200 can focus more on regions of interest and texture details. In the illustrated embodiments, dense connections (e.g., to be concatenated) between the three RSCBs 207, such that features in different depths can be reused and information loss can be mitigated or prevented. Embodiments of the SA block 305 are discussed in detail with reference to FIG. 4A, and the CA module 2072 are discussed in detail with reference to FIG. 4B.

As shown in FIG. 2, the reconstruction portion 25 is configured to get final SR frames 215. The reconstruction portion 25 includes two convolutional layers 209, 213 and an up-sampling layer 211. The convolutional layer 209 is used to reduce the channel numbers with a kernel size "1×1." Then an up-sampling process is performed by the up-sampling layer 211 (e.g., a sub-pixel layer can be used). The result of the up-sampling layer 211 is directed to the convolutional layer 213.

The final SR frames 215 can be obtained by adding the result from the convolutional layer 213 and $RPR_{output}$ 201. Before the up-sampling process, a global skip connection SK can be used to construct a residual network so to alleviate learning tasks of the multi-level semantic information mapping portion 23.

Figure 3B:
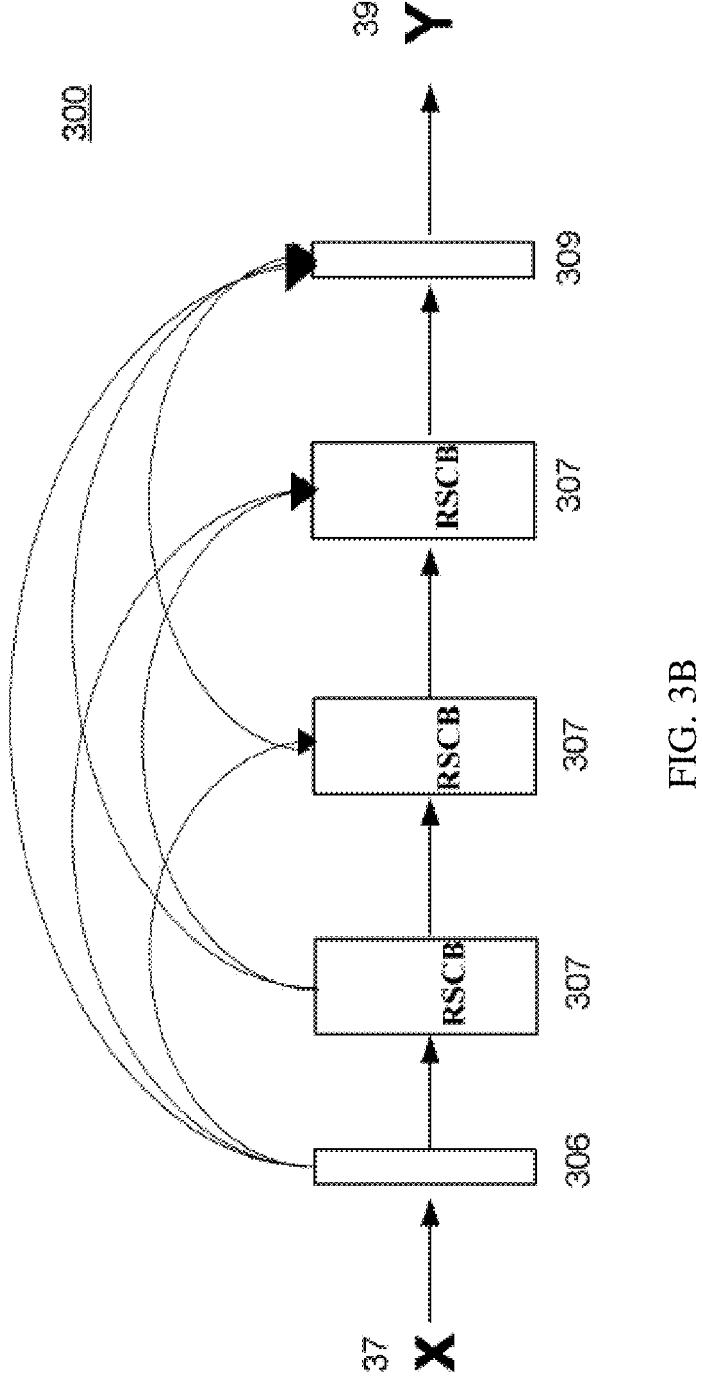
FIG. 3B is a schematic diagram illustrating a dense connection structure in accordance with one or more implementations of the present disclosure.

FIG. 3B is a schematic diagram illustrating a dense connection structure 300 in accordance with one or more implementations of the present disclosure. As shown in FIG. 3B, the dense connection structure 300 includes an input 37, a front convolutional layer 306, three RSCBs 307, a rear convolutional layer 309, and an output 39. As shown, the RSCBs 307 are "sandwiched" by the front convolutional layer 306 and the rear convolutional layer 309. By this "dense connection" arrangement, the features in different depths from the RSCBs 304 can be reused so as to prevent or mitigate information loss. In some embodiments, the dense connection structure 300 can have two or more RSCBs 307.

Figure 4A:
FIG. 4A is a schematic diagram illustrating a spatial attention process in accordance with one or more implementations of the present disclosure.
Figure 4A:
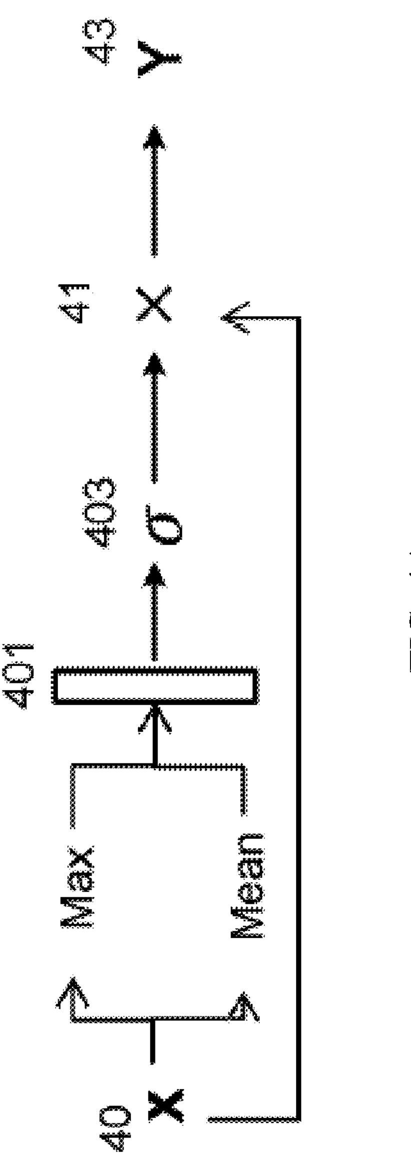

FIG. 4A is a schematic diagram illustrating a spatial attention block 400A in accordance with one or more implementations of the present disclosure. As shown, the SA block 400A includes an input (X) 40, a maximum operation (Max), a mean operation (Mean), a convolutional layer 401, a sigmoid operation 403, a multiplication operation (41), and an output (Y) 43. First, the max operation (Max) and the mean operation (Mean) are used to maximum and mean values of input features of the input 40. Then, the results of the max operation (Max) and the mean operation (Mean) are concatenated and then are directed to the convolutional layer 401. The sigmoid operation 403 is used to obtain attention weights of different spatial regions. The attention weights are then multiplied (at multiplier "x" 41) with the input 40 so as to obtain the output 43 including final features with spatial attention weights.

Figure 4B:
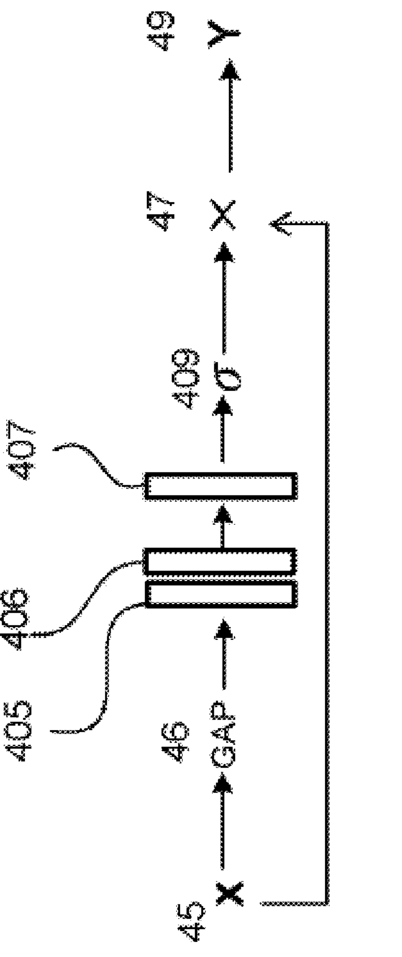
FIG. 4B is a schematic diagram illustrating a channel attention process in accordance with one or more implementations of the present disclosure.
Figure 5A:
FIGS. 5A to 5D are images illustrating testing results in accordance with one or more implementations of the present disclosure.
Figure 5B:
Figure 5B:
Figure 5C:
Figure 5D:

FIG. 4B is a schematic diagram illustrating a channel attention (CA) block 400B in accordance with one or more implementations of the present disclosure. The channel attention block 400B includes an input (X) 45, a global average pooling (GAP) layer 46, a squeeze layer 405 followed by an ReLU layer 406, an excitation layer 407, a sigmoid operation 409, and a multiplication operation 47. The GAP layer 16 is used to obtain an overall distribution of all channels of the input 40. In some embodiments, singular channels can be discarded. After a squeeze and excitation operation, a feature recalibration process can be performed by the CA block 400B. Through the foregoing mechanism, a network (e.g., the RPR-based SR network 200) can learn to use global information to selectively emphasize informative features while suppressing less-useful features. Further, the weights of different channels can be obtained by a sigmoid process 407, and then the features with channel attention weights can be obtained by a multiplying process 47. An output (Y) 49 can then be generated.

In some embodiments, a loss function can be used to facilitate the calculation discussed herein. For example, L1 and L2 loss can be used to train the proposed framework discussed herein. The loss function f(x) can be expressed as follows:

$$\text{Loss} = \alpha * \frac{1}{N}\left(\sum_x |y(x) - \hat{y}(x)|\right) + \frac{1}{N}\left(\sum_x \|y(x) - \hat{y}(x)\|^2\right) \quad \text{Equation (1)}$$

Where "α" is a coefficient to balance the L1 and L2 loss. In some embodiments, "a" can be set as "0.1." In some embodiments, only L1 loss is used to speed up the convergence until "epoch" is 250 ("epochs" is the total epoch number of training process and "epoch" is a current index). Then L1 loss and L2 loss can be combined into the loss function as described in Equation (1) to generate better results (e.g., 250<epoch<=300).

FIGS. 5A to 5D are images illustrating testing results (QP 42) in accordance with one or more implementations of the present disclosure. Descriptions of the images are as follows: (a) an original image ("Ground Truth"); (b) LR reconstructed frame ("$REC_{LR}$") (bottom) and LR prediction frame ("$PRE_{LR}$") (top) (c) a result of RPR up-sampling 201 ("$RPR_{output}$"), and (e) an image processed by the framework discussed herein. As can be seen and support by the testing result below, the present framework (i.e., (d)) provides better image quality, as compared to images (b) and (c).

Tables 1 and 2 below show quantitative measurements of the use of the present framework. The test results under "all intra" (AI) and "random access" (RA) configurations. Among them, "bold numbers" represent positive gain and "underlined" numbers represents negative gain. These tests are all conducted under "CTC." "VTM-11.0" with new "MCTF" are used as the baseline for tests. Tables 1 and 2 show the results in comparison with VTM 11.0 NNVC-2.0 anchor. The present framework achieves "−8.98%" and "−4.05%" BD-rate reductions on Y channel under AI and RA configuration, respectively.

TABLE 1

(Results of the proposed method in AI configuration compared with NNVC anchor)

| | | All Intra Main10 Over VTM-11.0 + New MCTF (QP 22, 27, 32, 37, 42) | | | | |
|---|---|---|---|---|---|---|
| | | Y | U | V | EncT | DecT |
| Cass A1 | Tango2 | **−10.16%** | — | — | | |
| 4K | FoodMarket4 | **−3.86%** | — | — | | |
| | Campfire | **−12.33%** | — | — | | |
| | CatRobot1 | **−9.62%** | — | — | | |
| Class A2 | DaylightRoad2 | **−4.07%** | — | — | | |
| 4K | ParkRunning3 | **−13.86%** | — | — | | |
| Average on A1 | | **−8.78%** | — | — | | |
| Average on A2 | | **−9.18%** | — | — | | |
| Overall | | **−8.98%** | — | — | | |

TABLE 2

(Results of the proposed method in RA configuration compared with NNVC anchor.)

| | | Random Access Main10 Over VTM-11.0 + New MCTF (QP 22, 27, 32, 37, 42) | | | | |
|---|---|---|---|---|---|---|
| | | Y | U | V | EncT | DecT |
| Cass A1 | Tango2 | **−7.48%** | — | — | | |
| 4K | FoodMarket4 | **−5.07%** | — | — | | |
| | Campfire | **−14.44%** | — | — | | |
| Class A2 | CatRobot1 | 1.68% | — | — | | |
| 4K | DaylightRoad2 | 11.53% | — | — | | |
| | ParkRunning3 | **−10.52%** | — | — | | |
| Average on A1 | | **−9.00%** | — | — | | |
| Average on A2 | | 0.90% | — | — | | |
| Overall | | **−4.05%** | — | — | | |

Figure 6A:
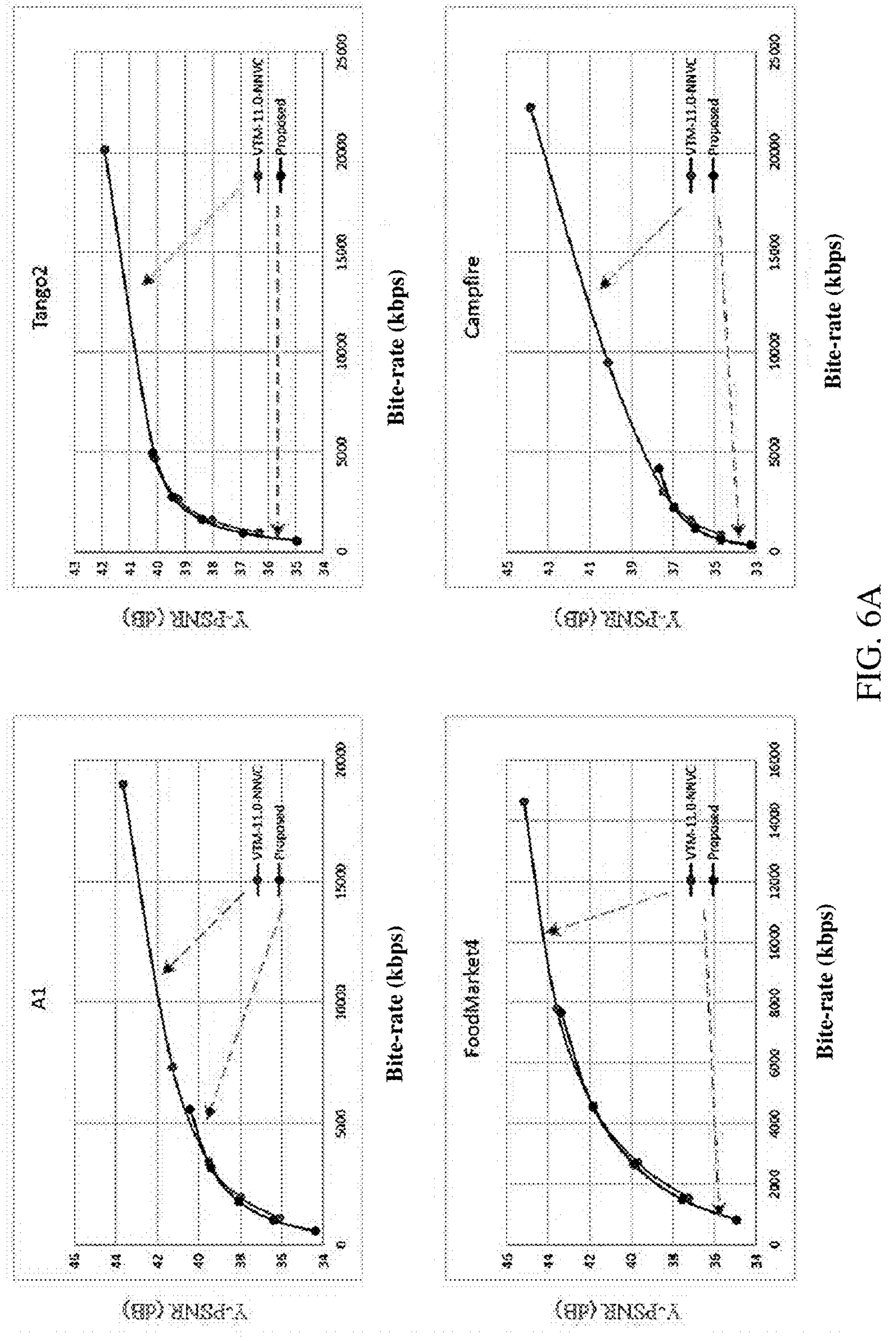
FIGS. 6A, 6B, 7A and 7B are testing results of the framework in accordance with one or more implementations of the present disclosure.
Figure 6B:
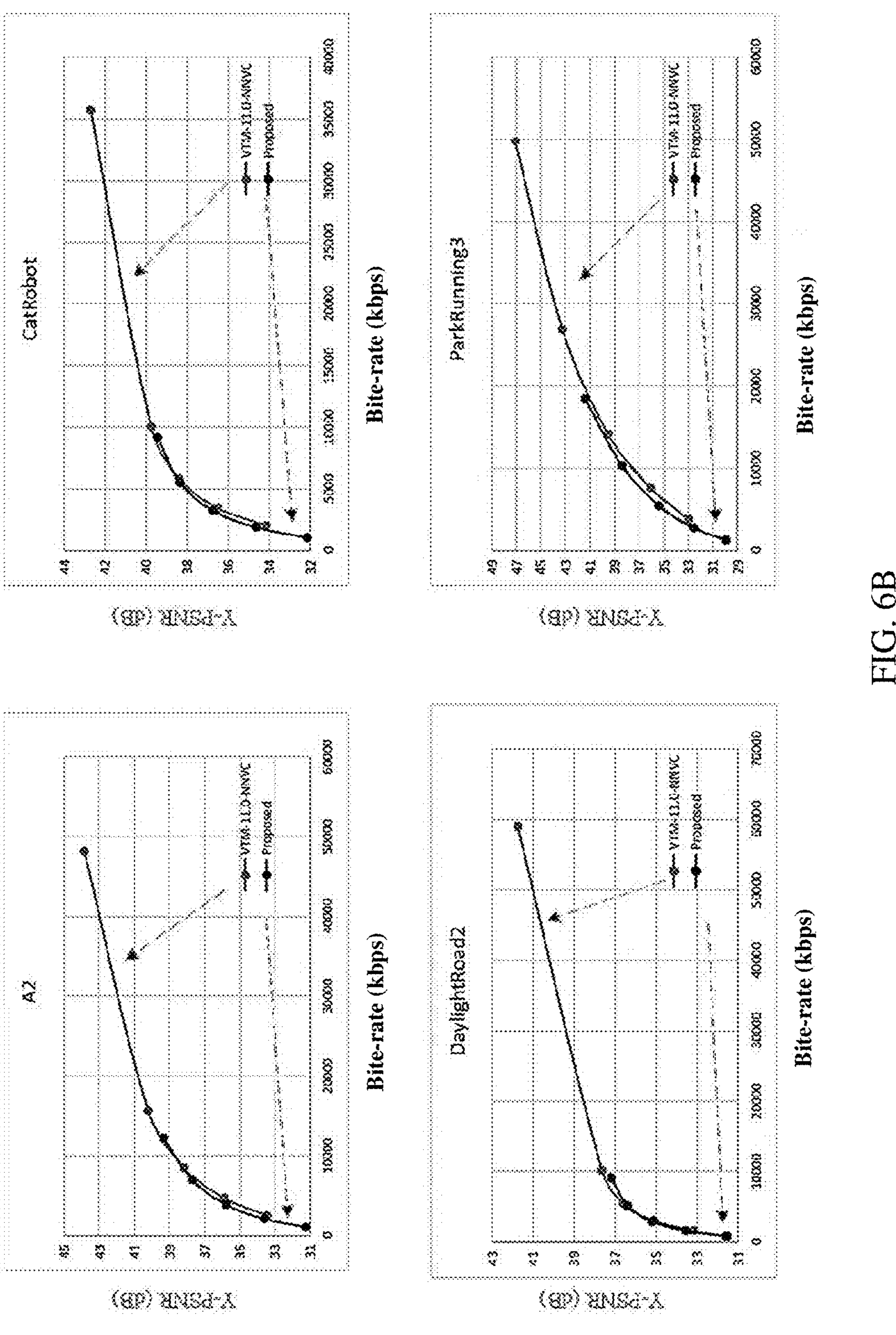
Figure 7A:
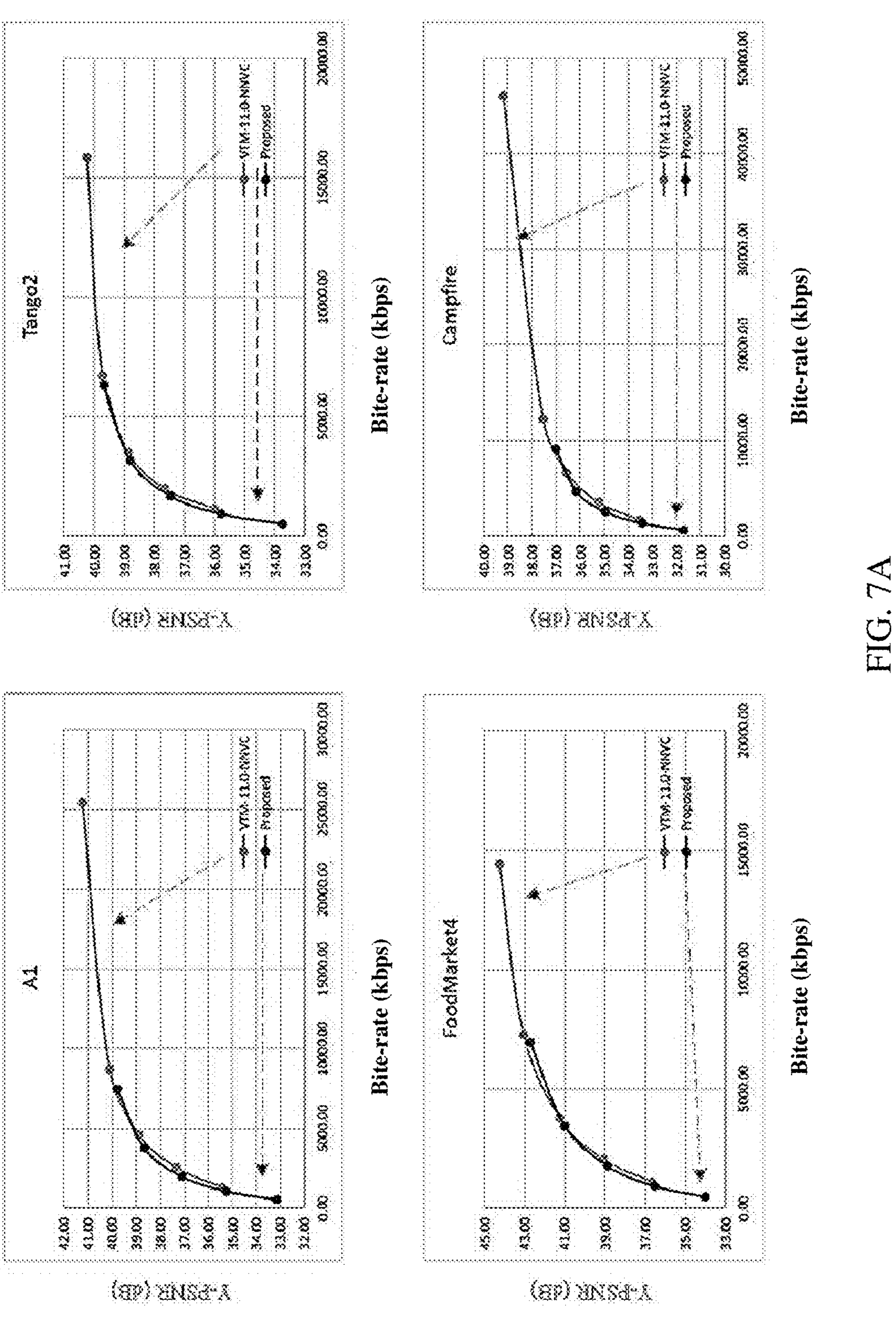
Figure 7B:
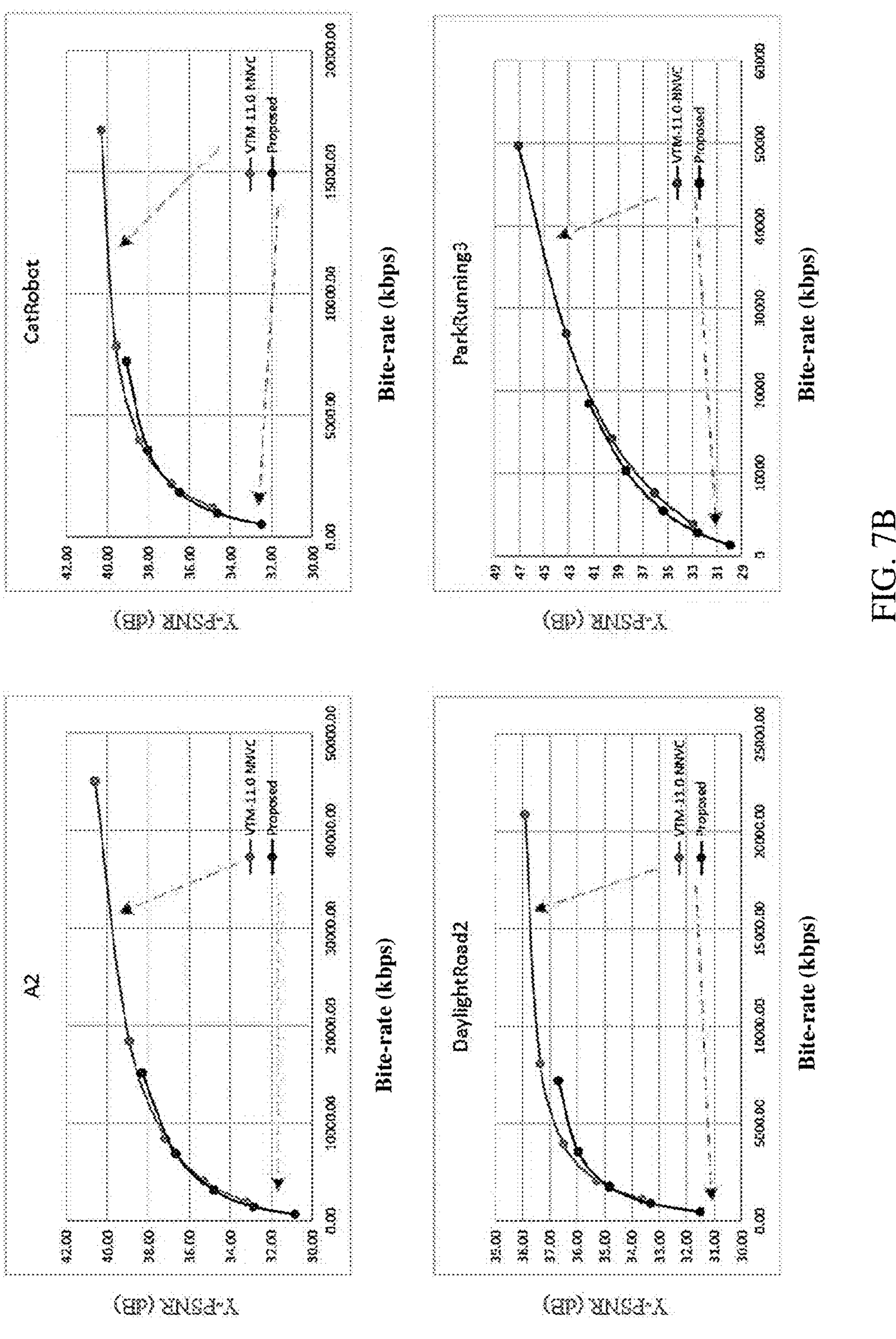

FIGS. 6A, 6B, 7A and 7B are testing results of the framework in accordance with one or more implementations of the present disclosure. FIGS. 6A to 6B use rate distortion (RD) curves to demonstrate the testing result. "A" stands for the average of different groups (A1 and A2). The RD curve of the A1 and A2 sequences are presented in FIGS. 6A to 6B. As shown, the present framework (noted as "proposed") achieves remarkable gains all of the A1 and A2 sequences. Among them, all the RD curves of the present framework exceed those of VTM-11.0 in a lower bitrate region (i.e., the left of the curves), which indicates that the proposed framework is more efficient at a low bandwidth.

Figure 8:
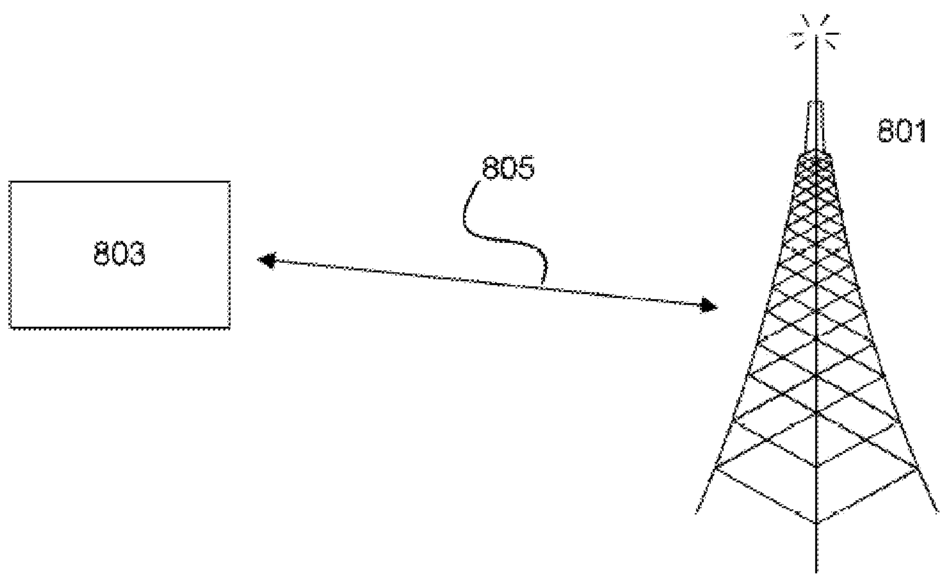
FIG. 8 is a schematic diagram of a wireless communication system in accordance with one or more implementations of the present disclosure.

FIG. 8 is a schematic diagram of a wireless communication system 800 in accordance with one or more implementations of the present disclosure. The wireless communication system 800 can implement the framework discussed herein. As shown in FIG. 8, the wireless communications system 800 can include a network device (or base station) 801. Examples of the network device 801 include a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP), etc. In some embodiments, the network device 801 can include a relay station, an access point, an in-vehicle device, a wearable device, and the like. The network device 801 can include wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. A 5G system or network can be referred to as a new radio (New Radio, NR) system or network.

In FIG. 8, the wireless communications system 800 also includes a terminal device 803. The terminal device 803 can be an end-user device configured to facilitate wireless communication. The terminal device 803 can be configured to wirelessly connect to the network device 801 (via, e.g., via a wireless channel 805) according to one or more corresponding communication protocols/standards. The terminal device 803 may be mobile or fixed. The terminal device 803 can be a user equipment (UE), an access terminal, a user unit, a user station, a mobile site, a mobile station, a remote station, a remote terminal, a mobile device, a user terminal, a terminal, a wireless communications device, a user agent, or a user apparatus. Examples of the terminal device 803 include a modem, a cellular phone, a smartphone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an Internet-of-Things (IoT) device, a device used in a 5G network, a device used in a public land mobile network, or the like. For illustrative purposes, FIG. 8 illustrates only one network device 801 and one terminal device 803 in the wireless communications system 800. However, in some instances, the wireless communications system 800 can include additional network device 801 and/or terminal device 803.

Figure 9:
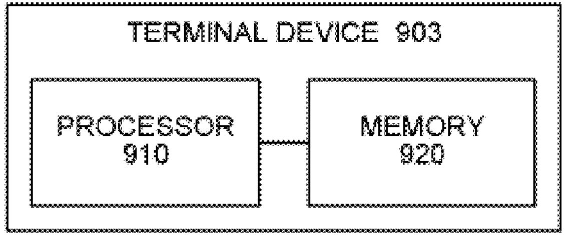
FIG. 9 is a schematic block diagram of a terminal device in accordance with one or more implementations of the present disclosure.

FIG. 9 is a schematic block diagram of a terminal device 903 (e.g., which can implement the methods discussed herein) in accordance with one or more implementations of the present disclosure. As shown, the terminal device 903 includes a processing unit 910 (e.g., a DSP, a CPU, a GPU, etc.) and a memory 920. The processing unit 910 can be configured to implement instructions that correspond to the methods discussed herein and/or other aspects of the implementations described above. It should be understood that the processor 910 in the implementations of this technology may be an integrated circuit chip and has a signal processing capability. During implementation, the steps in the foregoing method may be implemented by using an integrated logic circuit of hardware in the processor 910 or an instruction in the form of software. The processor 910 may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor 910 may be a microprocessor, or the processor 910 may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory 920, and the processor 910 reads information in the memory 920 and completes the steps in the foregoing methods in combination with the hardware thereof.

It may be understood that the memory 920 in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type. In some embodiments, the memory may be a non-transitory computer-readable storage medium that stores instructions capable of execution by a processor.

Figure 10:
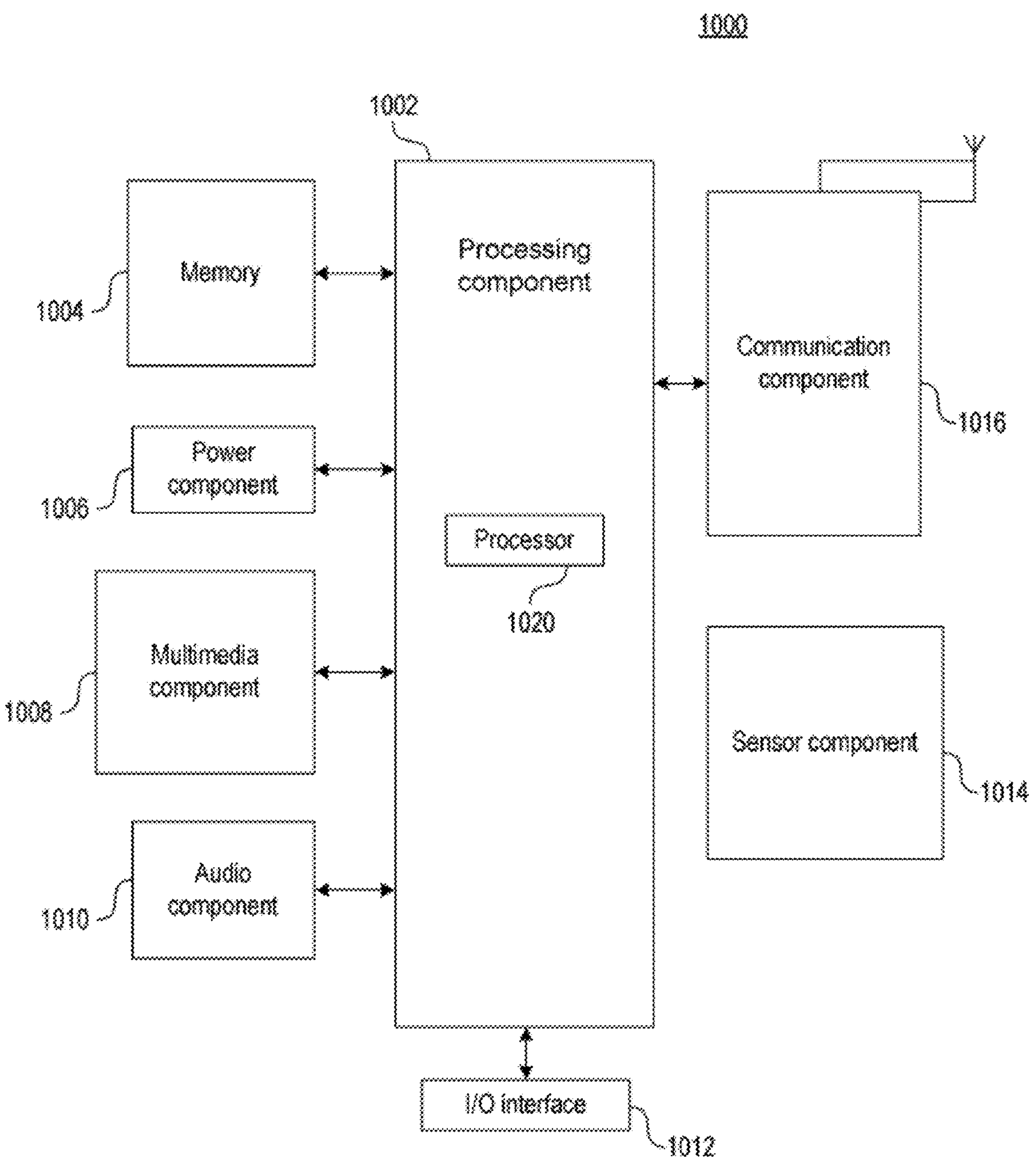
FIG. 10 is a schematic block diagram of a device in accordance with one or more implementations of the present disclosure.

FIG. 10 is a schematic block diagram of a device 1000 in accordance with one or more implementations of the present disclosure. The device 1000 may include one or more of the following components: a processing component 1002, a memory 1004, a power component 1006, a multimedia component 1008, an audio component 1010, an Input/Output (I/O) interface 1012, a sensor component 1014, and a communication component 1016.

The processing component 1002 typically controls overall operations of the electronic device, such as the operations associated with display, telephone calls, data communications, camera operations, and recording operations. The processing component 1002 may include one or more processors 1020 to execute instructions to perform all or part of the steps in the abovementioned method. Moreover, the processing component 1002 may include one or more modules which facilitate interaction between the processing component 1002 and the other components. For instance, the processing component 1002 may include a multimedia module to facilitate interaction between the multimedia component 1008 and the processing component 1002.

The memory 1004 is configured to store various types of data to support the operation of the electronic device. Examples of such data include instructions for any application programs or methods operated on the electronic device, contact data, phonebook data, messages, pictures, video, etc. The memory 1004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1006 provides power for various components of the electronic device. The power component 1006 may include a power management system, one or more power supplies, and other components associated with generation, management and distribution of power for the electronic device.

The multimedia component 1008 may include a screen providing an output interface between the electronic device and a user. In some embodiments, the screen may include a Liquid Crystal Display (LCD) and a Touch Panel (TP). If the screen may include the TP, the screen may be implemented as a touch screen to receive an input signal from the user. The TP may include one or more touch sensors to sense touches, swipes and gestures on the TP. The touch sensors may not only sense a boundary of a touch or swipe action but also detect a duration and pressure associated with the touch or swipe action. In some embodiments, the multimedia component 1008 may include a front camera and/or a rear camera. The front camera and/or the rear camera may receive external multimedia data when the electronic device is in an operation mode, such as a photographing mode or a video mode. Each of the front camera and the rear camera may be a fixed optical lens system or have focusing and optical zooming capabilities.

The audio component 1010 is configured to output and/or input an audio signal. For example, the audio component 1010 may include a Microphone (MIC), and the MIC is configured to receive an external audio signal when the electronic device is in the operation mode, such as a call mode, a recording mode and a voice recognition mode. The received audio signal may further be stored in the memory 1004 or sent through the communication component 1016. In some embodiments, the audio component 1010 further may include a speaker configured to output the audio signal.

The I/O interface 1012 provides an interface between the processing component 1002 and a peripheral interface module, and the peripheral interface module may be a keyboard, a click wheel, a button and the like. The button may include, but not limited to, a home button, a volume button, a starting button and a locking button.

The sensor component 1014 may include one or more sensors configured to provide status assessment in various aspects for the electronic device. For instance, the sensor component 1014 may detect an on/off status of the electronic device and relative positioning of components, such as a display and small keyboard of the electronic device, and the sensor component 1014 may further detect a change in a position of the electronic device or a component of the electronic device, presence or absence of contact between the user and the electronic device, orientation or acceleration/deceleration of the electronic device and a change in temperature of the electronic device. The sensor component 1014 may include a proximity sensor configured to detect presence of an object nearby without any physical contact. The sensor component 1014 may also include a light sensor, such as a Complementary Metal Oxide Semiconductor (CMOS) or Charge Coupled Device (CCD) image sensor, configured for use in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the electronic device and other equipment. The electronic device may access a communication-standard-based wireless network, such as a WIFI network, a 2nd-Generation (2G) or 3G network or a combination thereof. In an exemplary embodiment, the communication component 1016 receives a broadcast signal or broadcast associated information from an external broadcast management system through a broadcast channel. In an exemplary embodiment, the communication component 1016 further may include a Near Field Communication (NFC) module to facilitate short-range communication. For example, the NFC module may be implemented on the basis of a Radio Frequency Identification (RFID) technology, an Infrared Data Association (IrDA) technology, an Ultra-Wide Band (UWB) technology, a BT technology and another technology.

In an exemplary embodiment, the electronic device may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1004 including an instruction, and the instruction may be executed by the processor 1002 of the electronic device to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In a first clause, the present application provides a method for image processing, and the method includes:

receiving an input image via an initial feature extraction portion, where the initial feature extraction portion includes a result of RPR up-sampling, a low resolution (LR) reconstructed picture, and an LR predicted picture, processing the input image by a first convolution layer; and processing the input image by a multi-level semantic information mapping portion to generate a combined image, where the multi-level semantic information mapping portion includes one or more residual spatial and channel attention blocks (RSCBs), where each of the RSCBs includes two or more residual spatial blocks (RSBs), and where processing the input image by the multi-level semantic information mapping portion includes:

concatenating outputs of the RSBs;

processing the concatenated outputs of the RSBs by a second convolutional layer so as to reduce a channel number; and obtaining a weight of channel by a channel attention (CA) block.

In a second clause, according to the first clause, the method further includes:

processing the combined image by a third convolutional layer so as to further reduce the channel number.

In a third clause, according to the second clause, the method further includes:

processing the combined image by an up-sampling layer.

In a fourth clause, according to the third clause, the method further includes:

directing a result of the up-sampling layer to a fourth convolutional layer; and generating an output image based on the result of the RPR up-sampling and a result of the fourth convolutional layer.

In a fifth clause, according to the first clause, the result of RPR up-sampling includes multiple frequency components.

In a sixth clause, according to the fifth clause, the multiple frequency components include a low frequency feature (LL) sub-band, a vertical feature (HL) sub-band, a horizontal feature (LH) sub-band, and a diagonal feature (HH) sub-band.

In a seventh clause, according to the sixth clause, the first convolutional layer has a "3×3" kernel size.

In an eighth clause, according to the first clause, the one or more RSCBs include three RSCBs in a dense connection structure.

In a ninth clause, according to the first clause, each of the RSCBs includes five RSBs.

In a tenth clause, according to the first clause, each of the RSBs includes a front convolutional layer with a "3×3" kernel size, a rectified linear unit (ReLU) layer, a rear convolutional layer with a "5×5" kernel size, and a spatial attention (SA) block.

In an eleventh clause, according to the first clause, each of the RSBs includes a rectified linear unit (ReLU) layer and a spatial attention (SA) block.

In a twelfth clause, according to the eleventh clause, the SA block includes a maximum operation, and a mean operation.

In a thirteenth clause, according to the eleventh clause, the SA block includes a sigmoid operation and a multiplication operation.

In a fourteenth clause, according to the first clause, the CA block includes a global average pooling (GAP) layer.

In a fifteenth clause, according to the first clause, the CA block includes a squeeze layer, an ReLU layer, and an excitation layer.

In a sixteenth clause, according to the first clause, wherein the CA block includes a sigmoid operation and a multiplication operation.

In a seventeenth clause, the present application provides a system for video processing, and the system includes:

a processor; and a memory configured to store instructions, when executed by the processor, to:

receive an input image via an initial feature extraction portion, where the initial feature extraction portion includes a result of RPR up-sampling, a low resolution (LR) reconstructed picture, and an LR predicted picture, process the input image by a first convolution layer; and process the input image by a multi-level semantic information mapping portion to generate a combined image, where the multi-level semantic information mapping portion includes one or more residual spatial and channel attention blocks (RSCBs), where each of the RSCBs includes two or more residual spatial blocks (RSBs), where processing the input image by the multi-level semantic information mapping portion includes:

concatenating outputs of the RSBs;

processing the concatenated outputs of the RSBs by a second convolutional layer so as to reduce a channel number; and obtaining a weight of channel by a channel attention (CA) block.

In an eighteenth clause, according to the thirteenth clause, the memory is further configured to store instructions, when executed by the processor, to:

process the combined image by a third convolutional layer so as to further reduce the channel number;

process the combined image by an up-sampling layer;

direct a result of the up-sampling layer to a fourth convolutional layer; and generate an output image based on the result of the RPR up-sampling and a result of the fourth convolutional layer.

In a nineteenth clause, according to the thirteenth clause, the first convolutional layer has a "3×3" kernel size, where the one or more RSCBs includes three RSCBs in a dense connection structure, where each of the RSCBs includes five RSBs, where each of RSBs includes a front convolutional layer with a "3×3" kernel size, a rectified linear unit (ReLU) layer, a rear convolutional layer with a "5×5" kernel size, and a spatial attention (SA) block.

In a twentieth clause, the present application provides a method for image processing, and the method includes:

- receiving an input image via an initial feature extraction portion, where the initial feature extraction portion includes a result of RPR up-sampling, a low resolution (LR) reconstructed picture, and an LR predicted picture,
- processing the input image by a first convolution layer; and
- processing the input image by a multi-level semantic information mapping portion to generate a combined image, where the multi-level semantic information mapping portion includes one or more residual spatial and channel attention blocks (RSCBs), where each of the RSCBs includes two or more residual spatial blocks (RSBs), where processing the input image by the multi-level semantic information mapping portion includes:
- concatenating outputs of the RSBs;
- processing the concatenated outputs of the RSBs by a second convolutional layer so as to reduce a channel number; and
- obtaining a weight of channel by a channel attention (CA) block,
- where each of RSBs includes a front convolutional layer with a "3×3" kernel size, a rectified linear unit (ReLU) layer, a rear convolutional layer with a "5×5" kernel size, and a spatial attention (SA) block;
- where the SA block includes a maximum operation, a mean operation, a sigmoid operation, and a multiplication operation; and
- where the CA block includes a global average pooling (GAP) layer, a squeeze layer, an ReLU layer, an excitation layer, a sigmoid operation, and a multiplication operation.

Figure 11:
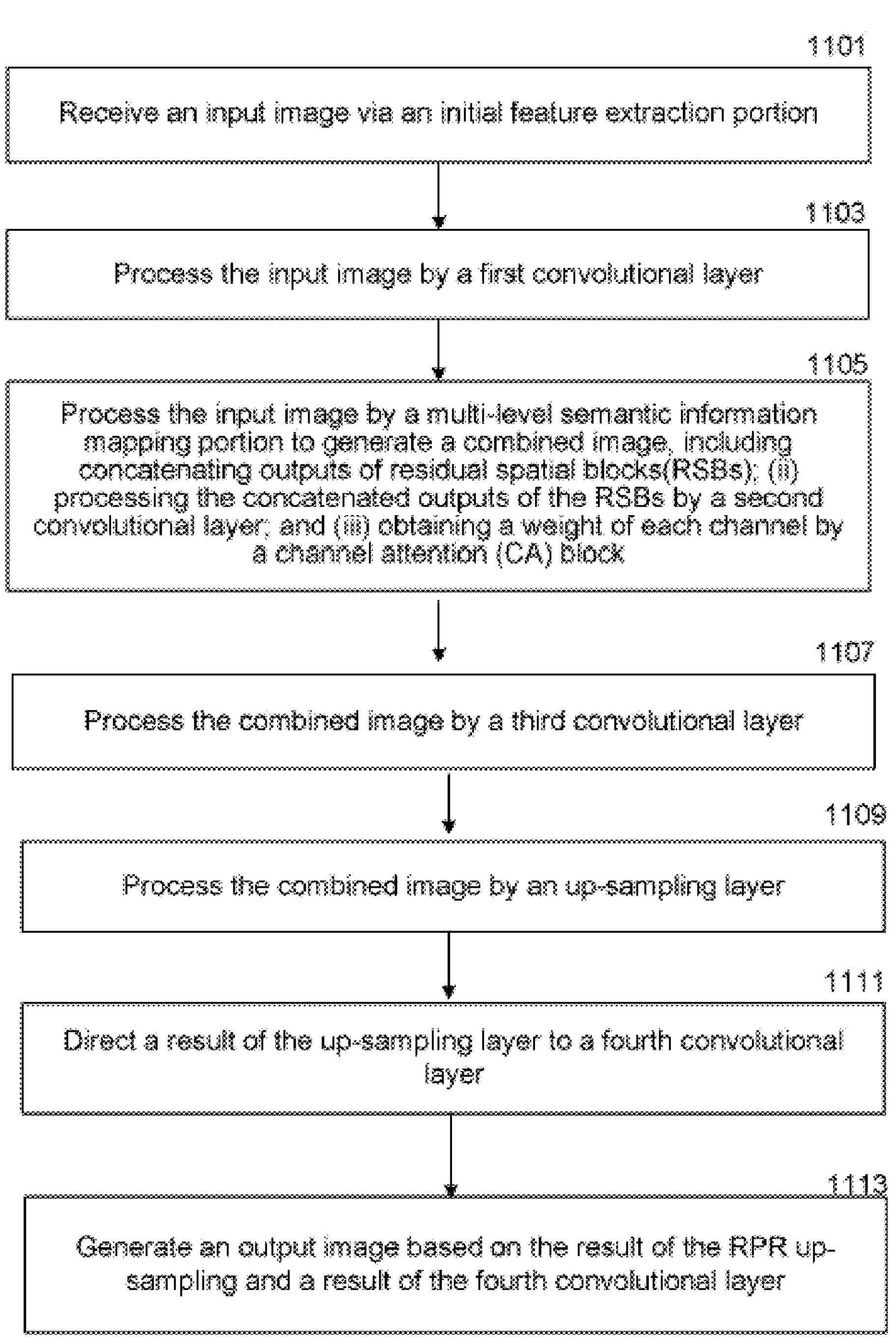
FIG. 11 is a flowchart of a method in accordance with one or more implementations of the present disclosure.

FIG. 11 is a flowchart of a method in accordance with one or more implementations of the present disclosure. The method 1100 can be implemented by a system (such as a system with the framework discussed herein). The method 1100 is for enhancing image qualities (particularly, for an up-sampling process). The method 1100 includes, at block 1101, receiving an input image via an initial feature extraction portion (e.g., component 21 in FIG. 2). In some embodiments, the initial feature extraction portion can include a result of RPR up-sampling, a low resolution (LR) reconstructed frame, and an LR predicted frame.

At block 1103, the method 1100 continues by processing the input image by a first convolution layer (e.g., component 206 in FIG. 2). In some embodiments, the first convolutional layer can have a "3×3" kernel size. The initial feature extraction portion can use the first convolution layer to integrate the three inputs (i.e., the result of RPR up-sampling, the LR reconstructed frame, and the LR predicted frame).

At block 1105, the method 1100 continues by processing the input image by a multi-level semantic information mapping portion (e.g., component 23 in FIG. 2) to generate a combined image. In some embodiments, the multi-level semantic information mapping portion can include one or more residual spatial and channel attention blocks (RSCBs), and each of the RSCBs includes two or more residual spatial blocks (RSBs). In some embodiments, the multi-level semantic information mapping portion can include three RSCBs, and each of the RSCBs can include five RSBs.

In some embodiments, processing the input image by the multi-level semantic information mapping portion includes: (i) concatenating outputs of the RSBs; (ii) processing the concatenated outputs of the RSBs by a second convolutional layer (e.g., component 2071 in FIG. 2) so as to reduce a channel number; and (iii) obtaining a weight of channel by a channel attention (CA) block.

In some embodiments, the CA block includes a global average pooling (GAP) layer, a squeeze layer, an ReLU layer, and an excitation layer. In some embodiments, the CA block can include a sigmoid operation and a multiplication operation At block 1107, the method 1100 continues by processing the combined image by a third convolutional layer (e.g., component 209 in FIG. 2) so as to further reduce the channel number. At block 1109, the method 1100 continues by processing the combined image by an up-sampling layer. At block 1111, the method 1100 continues by directing a result of the up-sampling layer to a fourth convolutional layer (e.g., component 213 in FIG. 2). At block 1113, the method 1100 continues by generating an output image based on the result of the RPR up-sampling and a result of the fourth convolutional layer.

In some embodiments, the result of RPR up-sampling includes multiple frequency components. In some embodiments, the multiple frequency components include a low frequency feature (LL) sub-band, a vertical feature (HL) sub-band, a horizontal feature (LH) sub-band, and a diagonal feature (HH) sub-band.

In some embodiments, each of the RSBs includes a front convolutional layer with a "3×3" kernel size, a rectified linear unit (ReLU) layer, a rear convolutional layer with a "5×5" kernel size, and a spatial attention (SA) block.

In some embodiments, each of the RSBs includes a rectified linear unit (ReLU) layer and a spatial attention (SA) block. In some embodiments, each of the SA block includes a maximum operation, a mean operation, a sigmoid operation, and a multiplication operation.

Additional Considerations

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The term "and/or" in this specification is only an association relationship for describing the associated objects, and indicates that three relationships may exist, for example, A and/or B may indicate the following three cases: A exists separately, both A and B exist, and B exists separately.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the disclosure is not limited, except as by the appended claims. In general, the terms used in the following claims should not be construed to limit the disclosed technology to the examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the disclosure are presented below in certain claim forms, the applicant contemplates the various aspects of the disclosure in any number of claim forms. Accordingly, the applicant reserves the right to pursue additional claims after filing this application to pursue such additional claim forms, in either this application or in a continuing application.

What is claimed is:

1. A method for image processing, comprising:

receiving an input image via an initial feature extraction portion, wherein the initial feature extraction portion includes a result of reference picture resampling (RPR) RPR up-sampling, a low resolution (LR) reconstructed picture, and an LR predicted picture, processing the input image by a first convolution layer; and processing the input image by a multi-level semantic information mapping portion to generate a combined image, wherein the multi-level semantic information mapping portion includes one or more residual spatial and channel attention blocks (RSCBs), wherein each of the RSCBs includes two or more residual spatial blocks (RSBs), and wherein processing the input image by the multi-level semantic information mapping portion includes:

concatenating outputs of the RSBs;

processing the concatenated outputs of the RSBs by a second convolutional layer so as to reduce a channel number; and obtaining a weight of channel by a channel attention (CA) block.

2. The method of claim 1, further comprising:

processing the combined image by a third convolutional layer so as to further reduce the channel number.

3. The method of claim 2, further comprising:

processing the combined image by an up-sampling layer.

4. The method of claim 3, further comprising:

directing a result of the up-sampling layer to a fourth convolutional layer; and generating an output image based on the result of the RPR up-sampling and a result of the fourth convolutional layer.

5. The method of claim 1, wherein the result of RPR up-sampling includes multiple frequency components.

6. The method of claim 5, wherein the multiple frequency components include a low frequency feature (LL) sub-band, a vertical feature (HL) sub-band, a horizontal feature (LH) sub-band, and a diagonal feature (HH) sub-band.

7. The method of claim 6, wherein the first convolutional layer has a "3×3" kernel size.

8. The method of claim 1, wherein the one or more RSCBs includes three RSCBs in a dense connection structure.

9. The method of claim 1, wherein each of the RSCBs includes five RSBs.

10. The method of claim 1, wherein each of the RSBs includes a front convolutional layer with a "3×3" kernel size, a rectified linear unit (ReLU) layer, a rear convolutional layer with a "5×5" kernel size, and a spatial attention (SA) block.

11. The method of claim 1, wherein each of the RSBs includes a rectified linear unit (ReLU) layer and a spatial attention (SA) block.

12. The method of claim 11, wherein the SA block includes a maximum operation, and a mean operation.

13. The method of claim 11, wherein the SA block includes a sigmoid operation and a multiplication operation.

14. The method of claim 1, wherein the CA block includes a global average pooling (GAP) layer.

15. The method of claim 1, wherein the CA block includes a squeeze layer, an ReLU layer, and an excitation layer.

16. The method of claim 1, wherein the CA block includes a sigmoid operation and a multiplication operation.

17. A system for video processing, the system comprising:

a processor; and a memory configured to store instructions, when executed by the processor, to: receive an input image via an initial feature extraction portion, wherein the initial feature extraction portion includes a result of reference picture resampling (RPR) up-sampling, a low resolution (LR) reconstructed picture, and an LR predicted picture, process the input image by a first convolution layer; and process the input image by a multi-level semantic information mapping portion to generate a combined image, wherein the multi-level semantic information mapping portion includes one or more residual spatial and channel attention blocks (RSCBs), wherein each of the RSCBs includes two or more residual spatial blocks (RSBs)

wherein processing the input image by the multi-level semantic information mapping portion includes:

concatenating outputs of the RSBs;

processing the concatenated outputs of the RSBs by a second convolutional layer so as to reduce a channel number; and obtaining a weight of channel by a channel attention (CA) block.

18. The system of claim 17, wherein the memory is further configured to store instructions, when executed by the processor, to:

process the combined image by a third convolutional layer so as to further reduce the channel number;

process the combined image by an up-sampling layer;

direct a result of the up-sampling layer to a fourth convolutional layer; and generate an output image based on the result of the RPR up-sampling and a result of the fourth convolutional layer.

19. The system of claim 17, wherein the first convolutional layer has a "3×3" kernel size, wherein the one or more RSCBs includes three RSCBs in a dense connection structure, wherein each of the RSCBs includes five RSBs, wherein each of RSBs includes a front convolutional layer with a "3×3" kernel size, a rectified linear unit (ReLU) layer, a rear convolutional layer with a "5×5" kernel size, and a spatial attention (SA) block.

* * * * *